(12) United States Patent
Grant

(10) Patent No.: US 11,896,003 B2
(45) Date of Patent: *Feb. 13, 2024

(54) APPLYING AND USING FIDUCIAL MARKINGS ON AGRICULTURAL APPARATUSES

(71) Applicant: Mineral Earth Sciences LLC, Mountain View, CA (US)

(72) Inventor: Elliott Grant, Woodside, CA (US)

(73) Assignee: MINERAL EARTH SCIENCES LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/971,303

(22) Filed: Oct. 21, 2022

(65) Prior Publication Data

US 2023/0044622 A1    Feb. 9, 2023

Related U.S. Application Data

(63) Continuation of application No. 16/543,111, filed on Aug. 16, 2019, now Pat. No. 11,510,405.

(51) Int. Cl.
*A01B 69/00* (2006.01)
*A01M 7/00* (2006.01)
(Continued)

(52) U.S. Cl.
CPC ....... *A01M 7/0089* (2013.01); *A01G 13/0262* (2013.01); *A01M 7/0042* (2013.01);
(Continued)

(58) Field of Classification Search
CPC .............. A01M 7/0089; A01M 7/0042; A01M 21/043; A01G 13/0262; A01G 13/0287;
(Continued)

(56) References Cited

U.S. PATENT DOCUMENTS 9,756,774 B1 * 9/2017 Wilson ................ A01B 79/005
9,913,429 B1    3/2018 Stubbs et al.
(Continued)

FOREIGN PATENT DOCUMENTS

CN     207978544      3/2018
DE    102011078292    1/2013
(Continued)

OTHER PUBLICATIONS

European Patent Office; Communication issued in Application No. 22199138.3; 30 pages; dated Dec. 13, 2022.
(Continued)

*Primary Examiner* — Shardul D Patel
(74) *Attorney, Agent, or Firm* — Gray Ice Higdon

(57) ABSTRACT

Implementations set forth herein relate to using fiducial markings on one or more localized portions of an agricultural apparatus in order to generate local and regional data that can be correlated for planning and executing agricultural maintenance. An array of fiducial markings can be disposed onto plastic mulch that surrounds individual crops, in order that each fiducial marking of the array can operate as a signature for each individual crop. Crop data, such as health and yield, corresponding to a particular crop can then be stored in association with a corresponding fiducial marking, thereby allowing the certain data for the particular crop to be tracked and analyzed. Furthermore, autonomous agricultural devices can rely on the crop data, over other sources of data, such as GPS satellites, thereby allowing the autonomous agricultural devices to be more reliable.

20 Claims, 10 Drawing Sheets

(51) Int. Cl.
*A01G 13/02* (2006.01)
*A01M 21/04* (2006.01)
*G05D 1/02* (2020.01)

(52) U.S. Cl.
CPC ......... *A01M 21/043* (2013.01); *G05D 1/0234* (2013.01); *G05D 1/0259* (2013.01); *A01G 13/0287* (2013.01); *G05D 2201/0201* (2013.01)

(58) Field of Classification Search
CPC .............. G05D 1/0234; G05D 1/0259; G05D 2201/0201; A01B 79/005; A01B 69/00; G06K 7/10297
USPC .......................................................... 47/32.3
See application file for complete search history.

(56) References Cited

U.S. PATENT DOCUMENTS

| | | | | |
|---|---|---|---|---|
| 11,510,405 B2 * | 11/2022 | Grant | ................... | G05D 1/0234 |
| 2010/0268562 A1 | 10/2010 | Anderson | | |
| 2015/0015697 A1 * | 1/2015 | Redden | ................ | A01C 21/007 |
| | | | | 382/110 |
| 2016/0025848 A1 | 1/2016 | Hole et al. | | |
| 2018/0259496 A1 * | 9/2018 | McPeek | ................ | G01N 33/025 |
| 2018/0295793 A1 | 10/2018 | Tambay et al. | | |
| 2021/0045379 A1 | 2/2021 | Grant | | |
| 2021/0053229 A1 | 2/2021 | Yuan et al. | | |

FOREIGN PATENT DOCUMENTS

| | | | |
|---|---|---|---|
| JP | 2007185111 | | 7/2007 |
| JP | 2007185111 A | * | 7/2007 |
| WO | 2016025848 | | 2/2016 |

OTHER PUBLICATIONS

China National Intellectual Property Administration; Notification of First Office Action issued in Application No. CN202080057943.1; 11 pages; dated Sep. 22, 2022.
European Patent Office; International Search Report and Written Opinion of PCT Ser. No. PCT/US2020/046108; 13 pages; dated Nov. 16, 2020.
Canadian Patent Office; Examination Report issued for Application No. 3151364; 7 pages; dated Mar. 30, 2023.
China National Intellectual Property Administration; Notice of Allowance issued in Application No. CN202080057943.1; 5 pages; dated Apr. 13, 2023.
Australian Patent Office; Examination Report issued in Application No. 2020333543; 6 pages; dated May 31, 2023.
Australian Patent Office; Notice of Acceptance issued for Application No. 2020333543, 6 pages, dated Aug. 31, 2023.

* cited by examiner

APPLYING AND USING FIDUCIAL MARKINGS ON AGRICULTURAL APPARATUSES

BACKGROUND

In areas of a field, agricultural conditions can rapidly change at a localized and regional level, with some changes resulting in healthier crops and other changes resulting in degradation of plant environments. In some instances, pests can damage certain areas of crops without warning or recognition by those persons tasked with overseeing such areas—and despite such pests typically having an observable origin. In other instances, crops can reap benefits from weather that is moving through a region, and such crops may be able to leverage certain benefits from the weather, at least with prior preparation relative to the weather. However, when agricultural personnel fail to recognize these benefits, those benefits are not leveraged to increase yields of the crops.

Although satellite imaging can be helpful for predicting activities of natural systems and how they may affect certain agricultural operations, satellite imaging may lack precise data, e.g., at the individual plant level, which otherwise could be harnessed to increase agricultural yields. It is possible to traverse various types of robots through agricultural areas to capture data at the individual plant level, e.g., using two-dimensional ("2D") and/or three-dimensional ("3D") sensors. However, many robots (also referred as "rovers") perform localization using position coordinate sensors, such as global position system ("GPS") sensors, that are often not sufficiently accurate or consistent to localize the robots at an individual plant level. Moreover, GPS may not operate in some scenarios, such as when crops are planted underneath or near a natural or man-made canopy.

SUMMARY

Implementations set forth herein relate to incorporating fiducial markings onto surfaces of agricultural apparatuses, such as synthetic mulch, in furtherance of collecting and analyzing agricultural data at a level of granularity that is difficult to achieve using conventional position coordinate sensors. The agricultural data can be generated by a mobile computing device (e.g. a robot or rover) that is tasked with identifying environmental conditions affecting agricultural areas at which the fiducial markings are located. Thereafter, the data can be used for assisting other autonomous agricultural devices that operate to inspect plants, perform routine agricultural tasks, and/or diagnose issues that may affect an environment of certain plants. In some implementations, the fiducial markings can be located on synthetic mulch, ground cover, drip tapes, hoses, tubing, emitters, pipes, dirt, mulch, plants, and/or any other feature of land that can assist with providing some amount of agricultural product.

In some implementations, the fiducial markings used to gather and/or track data can be located on synthetic mulch, which can be used for a variety of purposes such as maintaining soil moisture and/or preventing growth of weeds. A fiducial marking can be a label (e.g., a biodegradable sticker) that is applied to the synthetic mulch, or can be directly printed on the synthetic mulch. The fiducial marking can be recognizable by the mobile computing device and/or any suitable autonomous agricultural device. In any implementation discussed herein, an RFID, a Bluetooth beacon, and/or other apparatus that is detectable via electromagnetic signal, can be used in place of each fiducial marking and/or in combination with each fiducial marking. In this way, the apparatus can be detectable even when produce or other material may be covering the apparatus. The mobile computing device can scan the fiducial marking using one or more sensors of the mobile computing device and correlate the fiducial marking to plant data that is stored in association with a plant that may be most proximate to the fiducial marking. Features of the plant and/or environmental conditions of the plant can then be determined and embodied as plant-specific agricultural data that can be stored in association with the fiducial marking.

As an example, synthetic mulch can be disposed over an agricultural area in which a plurality of plants are, or will be, growing. The synthetic mulch can include an array of fiducial markings. The fiducial marking may be regularly spaced so that when plants are planted through the synthetic mulch, one or more fiducial markings are likely to be proximate each plant, or an algorithm can interpolate the distance between fiducials to determine the location of each plant. Before, during, and/or after a plant has yielded some amount of produce, the plant can be monitored by an autonomous agricultural device. The autonomous agricultural device can identify each fiducial marking, access agricultural data that is stored in association with the fiducial marking, and perform one or more maintenance operations on plants based on the agricultural data.

For instance, prior to planting or germination of a plurality of plants, a mobile computing device can navigate through an agricultural area, over which synthetic mulch is disposed, in order to identify each fiducial marking on the synthetic mulch. Each time the mobile computing device detects a fiducial marking, the mobile computing device can use one or more sensors to identify features of an environment surrounding the fiducial marking and then generate data based on the features of the environment. Thereafter, the data can be stored in association with the fiducial marking. For example, in some implementations, GPS data can be captured and stored in association with each fiducial marking (or a subset of markings), in order that autonomous agricultural devices may not have to rely on satellite GPS data in order to subsequently locate each plant. Rather, the autonomous agricultural devices can rely on the previously stored data and, optionally, compare the data to a known location in order to identify a location of a plant.

In some implementations, an ability of a robot to read every fiducial marking may not be necessary in order to determine and navigation to a location of a particular plant. Rather, the robot can interpolate locations when some markings are missing, obstructed, and/or damaged based on each fiducial marking corresponding to a pattern-based sequence and/or other predictable sequence. Additionally, or alternatively, when a fiducial marking is generated and/or a seed is initially planted, environmental conditions of the seed, the soil, the synthetic mulch, the weather, and/or any other information can be captured and stored in association with the fiducial marking. Such initial data can later be referenced by (i) the autonomous agricultural devices when performing subsequent maintenance near the plant and/or (ii) other systems and/or devices that can use the initial data for furthering other agricultural processes.

In some implementations, during plant growth, an autonomous agricultural device can be tasked with performing routine maintenance in order to keep each plant healthy during a growing and harvesting period. Such time can be crucial to farmers, as much produce can be susceptible to destruction by pests, over or under watering, malnourishment by deprivation of certain nutrients by weeds or other organisms, growth abnormalities, and/or any other features or qualities that can be experienced by a plant during growth. Moreover, during the growth of produce from a plurality of plants, the produce can exhibit positive qualities that may be indicated by their size, color, shape, texture, temperature, scent, weight, and/or any other quality that can be exhibited by a plant. Therefore, any of the positive and/or negative features experienced during plant growth can be detected by the mobile computing device and/or autonomous agricultural devices, and used to generate agricultural data that can be correlated with each plant.

As an example, agricultural data for a plant can be generated whenever a pest is detected near the plant in order that a problem and/or solution for the pest problem can be identified and used to prevent or resolve other pest issues in other agricultural areas. For instance, trends in pest populations can be identified based on multiple data entries in order to predict areas that may be subsequently affected by pests. In this way, in order to prevent future plant destruction by pests, certain deterrents can be employed in order to mitigate opportunities for pests to damage produce from plants predicted to be targeted by pests. Moreover, as such data is tracked over time for various agricultural areas and/or various different plants, an efficacy of certain pest deterrents can be measured. For example, when an autonomous agricultural device is tasked with assisting farmers with deploying pest deterrents, the autonomous agricultural device can identify each plant by a nearby fiducial marking (e.g., a fiducial marking disposed over a drip tube), identify a particular deterrent (e.g., an organic chemical deterrent) that is suitable for the type of plant, and deploy the deterrent as the autonomous agricultural device traverses an agricultural area.

When plants in an agricultural area are producing fruits, vegetables, and other produce, various data associated with such produce can be generated and stored in association with each respective fiducial marking. For example, an autonomous agricultural device that collects produce from a plant can identify a fiducial marking corresponding to the plant and generate production data characterizing a current total yield of produce from that particular plant. The production data can be used to identify correlations between the production data and various environmental changes that may have affected the particular plant over time.

In some implementations, a combination of fiducial markings can embody a wide-area fiducial marking that can be visible from above the agricultural area. For example, an array of fiducial markings can be visible from a vehicle that is flying over the array of fiducial markings, and the array of fiducial markings can be unique relative to other arrays of fiducial markings. A plurality of plants disposed about that area that includes an array of fiducial markings can be affected by wide-area environmental changes, which can also be visible from certain elevations and detected by other devices occupying such elevations. Such wide-area environmental changes can be characterized by agricultural data that can be stored in association with each fiducial marking that is part of the array of fiducial markings. For example, data characterizing an environmental condition can be stored in association with an identifier for a particular array of fiducial markings. Furthermore, that data can also be stored in association with each identifier for each fiducial marking of the particular array of fiducial markings. In this way, similar environmental changes that are predicted to affect other agricultural areas can be identified and used to mitigate any negative effects of the environmental changes to those other agricultural areas.

In some implementations, data that is collected and stored in association with the fiducial markings can be used to track produce that may eventually exhibit positive and/or negative qualities after the produce is moved outside of the agricultural area for consumption. As one non-limiting example, annual crops such as tomatoes can be subsequently used in the manufacturing of products such as tomato sauce, ketchup, etc. Prior to such manufacturing, the tomatoes can be analyzed to determine their quality, health, and/or other properties. When a batch of tomatoes are inspected at a manufacturing facility and determined to exhibit a deficiency (e.g., as indicated by abnormal texture and/or discoloration), a computer system at the manufacturing facility can generate data characterizing the deficient features of the batch of tomatoes. The manufacturing facility can transmit the data to an entity that manages the agricultural data corresponding to the batch of tomatoes and the fiducial markings located at the agricultural area from which the tomatoes arrived. The data can then be stored in association with one or more identifiers corresponding to one or more fiducial markings located proximate to particular tomato plants that yielded the particular batch of tomatoes analyzed at the manufacturing facility. In this way, any autonomous agricultural devices subsequently traversing the agricultural area that includes those particular tomato plants can identify the particular tomato plants via their assigned fiducial markings and perform some amount of maintenance (e.g., remove or add material or organism) to remedy deficient conditions of the particular tomato plants.

As used herein, when a plant is said to have yielded "deficient produce," that may refer to the plant having generated produce that exhibits deficiencies such as those described above in relation to tomatoes, or it may refer to the plant underperforming such that its produce yield fails to meet an expected yield, or both. The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
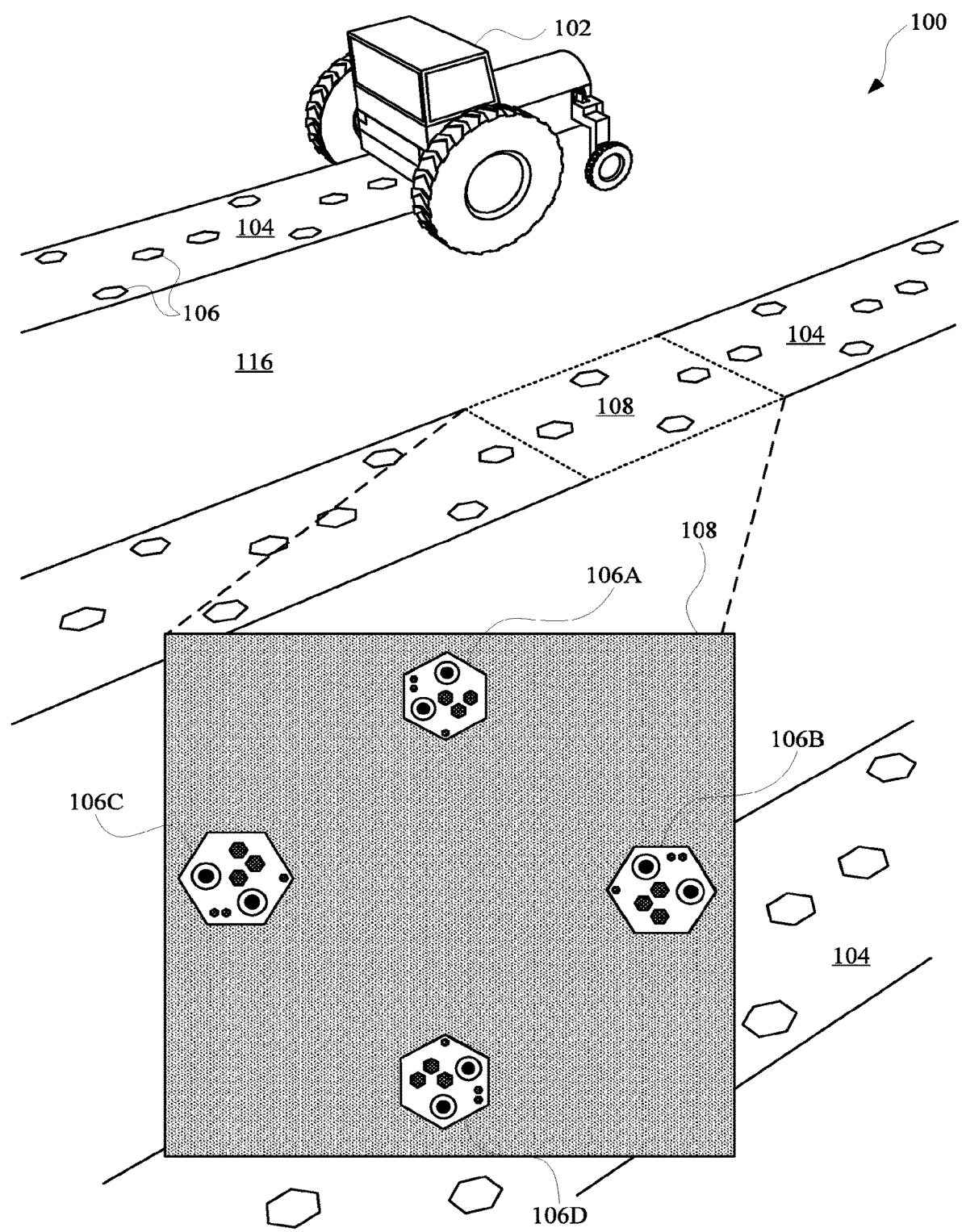
FIG. 1A, FIG. 1B, and FIG. 1C illustrate views of synthetic mulch, having fiducial markings, arranged over an agricultural area for improving plant yield.

FIG. 1A illustrates a view 100 of a vehicle 102 that arranges synthetic mulch 104, having fiducial markings 106, over an agricultural area 116. The synthetic mulch can be pre-printed with the fiducial markings 106, and each fiducial markings 106 can be generated to convey a unique symbol or other 1D, 2D, and/or 3D marking. Alternatively, or additionally, each fiducial marking 106 can be printed onto the synthetic mulch 104 by/at the vehicle 102, simultaneous to the vehicle 102 laying the synthetic mulch 104 onto the agricultural area 116. Alternatively, or additionally, each fiducial marking 106 can be an apparatus that includes an RFID tag and/or one or more sensors for detecting properties of the agricultural area 116 such as, but not limited to, moisture, soil pH and/or soil content, temperature, living organisms, and/or any other features or properties that can be exhibited by soil.

As provided in FIG. 1A, the fiducial markings 106 can include indicia that is detectable by one or more computing devices, such that a particular computing device can correlate the indicia to: stored data, one or more plants in the agricultural area 116, equipment that operates in the agricultural area 116, produce from the one or more plants in the agricultural area 116, and/or any other feature or information that can be associated with an agricultural area. For instance, the fiducial markings 106 can include a printed symbol, such as at least printed symbols 106A, 106B, 106C, and 106D.

In some implementations, each printed symbol can be a unique, sequential identifier, but can be arranged in a similar orientation relative to other printed symbols. In some implementations, each printed symbol can include a one-dimensional barcode, a two-dimensional or matrix bar code such as a Quick Response® ("QR") code, a sequences of characters/numbers/symbols, and/or any other marking that can be uniquely generated by a computing device. Alternatively, or additionally, one or more printed symbols can be the same as one or more other printed symbols on the synthetic mulch 104, and the one or more printed symbols can have the same or a different orientation than the one or more other printed symbols on the synthetic mulch 104.

In some implementations, each additional fiducial marking 106 can be arranged to indicate a direction in which the finished marking 106 is oriented. As an example, the printed symbol 106A can be rotated 90 degrees counter-clockwise from the printed symbol 106C, a printed symbol 106C can be rotated 180 degrees counterclockwise from the printed symbol 106B, and a printed symbol 106D can be rotated 90 degrees clockwise from a printed symbol 106B. In this way, as a robot (e.g., robot 202) traverses the agricultural area 116 and scans one or more fiducial markings 106, the robot can determine: a direction in which the synthetic mulch 104 is extending, an orientation of multiple different strips of synthetic mulch 104, and/or a location of the robot relative to the fiducial markings 106 and/or plants 118 (shown in FIG. 1C).

In some implementations, fiducial markings 106 can be disposed over one or more other features of an agricultural area 116 such as, irrigation drip tape, tubing, ground cover, nursery pots, silage bags, fumigation films, soil films, sensors, and/or any other apparatus or feature of an agricultural area. One or more fiducial markings 106 can be correlated with properties and/or information associated with the agricultural area 116. Some properties and/or information can include, but are not limited to, any relevant information that can be correlated with one or more plants in the agricultural area. For instance, a fiducial marking can be correlated with an identifier for a nearby plant, and as the plant grows and yields produce, certain information such as plant type, plant age, yield, location, and/or any other data can be stored in association with the identifier for the plant and/or one or more nearby fiducial markings.

In some implementations, fiducial markings 106 can be disposed over features of the agricultural area 116 and the fiducial markings 106 can be visible from aerial vehicles such as drones, planes, rockets, satellites, and/or any other apparatus that can fly over the agricultural area. As an example, one or more rows of fiducial markings 106 can collectively represent one or more symbols that are visible from an aerial perspective (e.g., from one or more vision components operatively coupled to a satellite). In this way, one or more individual fiducial markings 106 can be used for identifying individual plants, whereas the one or more symbols created by the collection of fiducial markings 106 can be used for distinguishing a row and/or a field of the plants from another field of other plants.

Figure 1B:
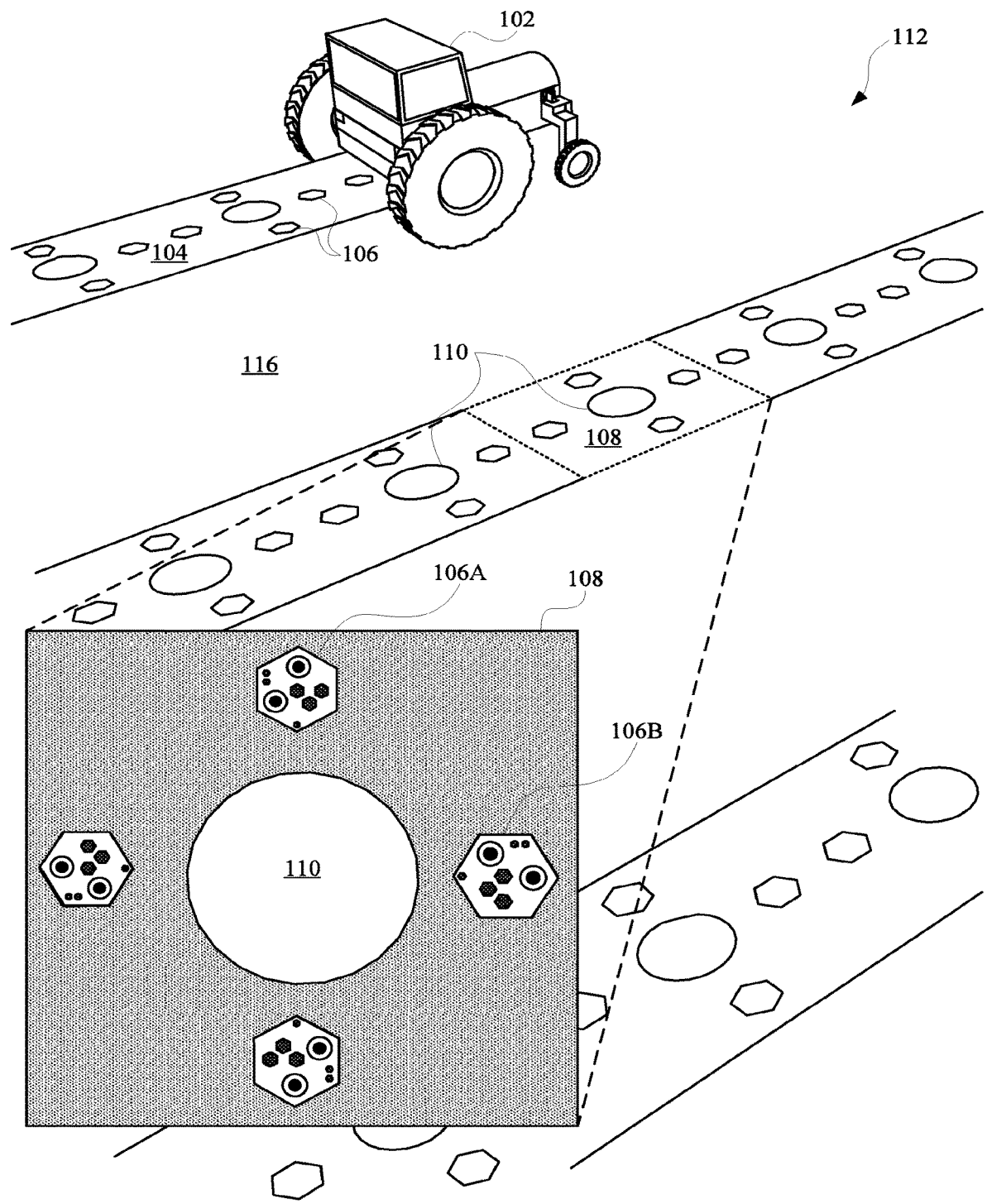

In some cases, when a particular agricultural area is ready for seeds, the vehicle 102 and/or another agricultural device can create an opening 110 in portions of the synthetic mulch 104 in order to provide a space in which to plant one or more seeds, as illustrated in view 112 of FIG. 1B. Alternatively, seeds may be planted in the soil first, and then synthetic mulch 104 may be laid on top of the soil. This may enable the synthetic mulch to, for instance, condition the soil by heating it, allowing certain wavelengths of light through, etc. A location for an opening 110 can be determined based on properties of soil beneath the synthetic mulch 104, as detected by one or more sensors embedded in the synthetic mulch 104 and/or in communication with the vehicle 102. Alternatively, or additionally, openings 110 can be disposed about the synthetic mulch 104, regardless of locations of fiducial markings 106, at least based on the fiducial markings 106 having a variety of unique markings, thereby providing a surplus of markings that can be associated with each plant that will eventually protrude through the opening 110 as the plant grows.

Figure 1C:
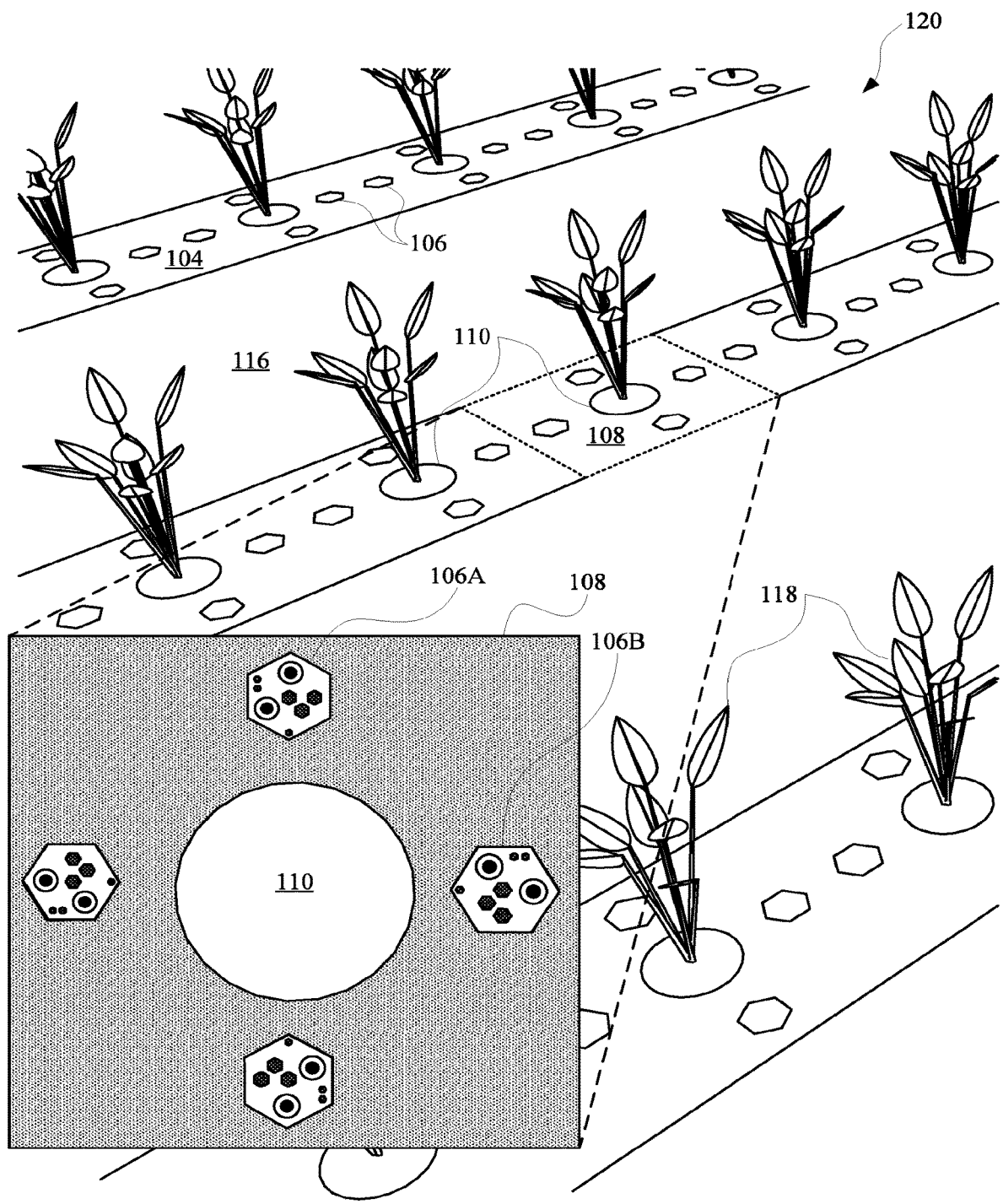

FIG. 1C illustrates a view 120 of plants 118 growing through openings 110 of the synthetic mulch 104 that includes the fiducial markings 106. In some implementations, properties of the synthetic mulch 104 can provide various benefits to the plants 118 as they grow and yield produce. For example, the synthetic mulch 104 can have optical properties capable of filtering certain frequencies of light such as ultraviolet, visible, near-infrared, middle infrared, and/or any other range or ranges of frequencies of the electromagnetic spectrum. Alternatively, or additionally, the synthetic mulch 104 can exhibit properties that may increase produce yield, increase produce size, shorten growth time, provide an anti-drip effect, provide an anti-fog effect, exhibit ultra-thermic properties, reduce water loss, prevent insect or pest infestation, mediate photosynthetically active radiation, maintaining humidity, maintain certain features of soil such as maintaining methyl bromide within the soil, and/or any other property that can improve health and/or quality of natural organisms within an agricultural area 116.

Although the openings 110 provided in FIG. 1C are surrounded by and/or otherwise proximate to fiducial markings 106—in some implementations, an opening 110 may not be entirely surrounded by fiducial markings 106, but rather, can be adjacent to one or more fiducial markings 106. As noted previously, each fiducial marking 106 can include a QR code, a barcode, natural language content, and/or any other marking that can be uniquely generated by a computing device. In some implementations, each fiducial marking 106 can be correlated to an identifier, such as data stored at a remote computing device or server, and the identifier can be correlated to an owner of the agricultural area 116 and/or a date in which the synthetic mulch 104 was provided at, and/or removed from, the agricultural area 116. In this way, should synthetic mulch 104 be removed and disposed of, the synthetic mulch 104 can be later-identified in order to verify that the synthetic mulch 104 has been properly recycled and/or otherwise disposed of properly.

Figure 2A:
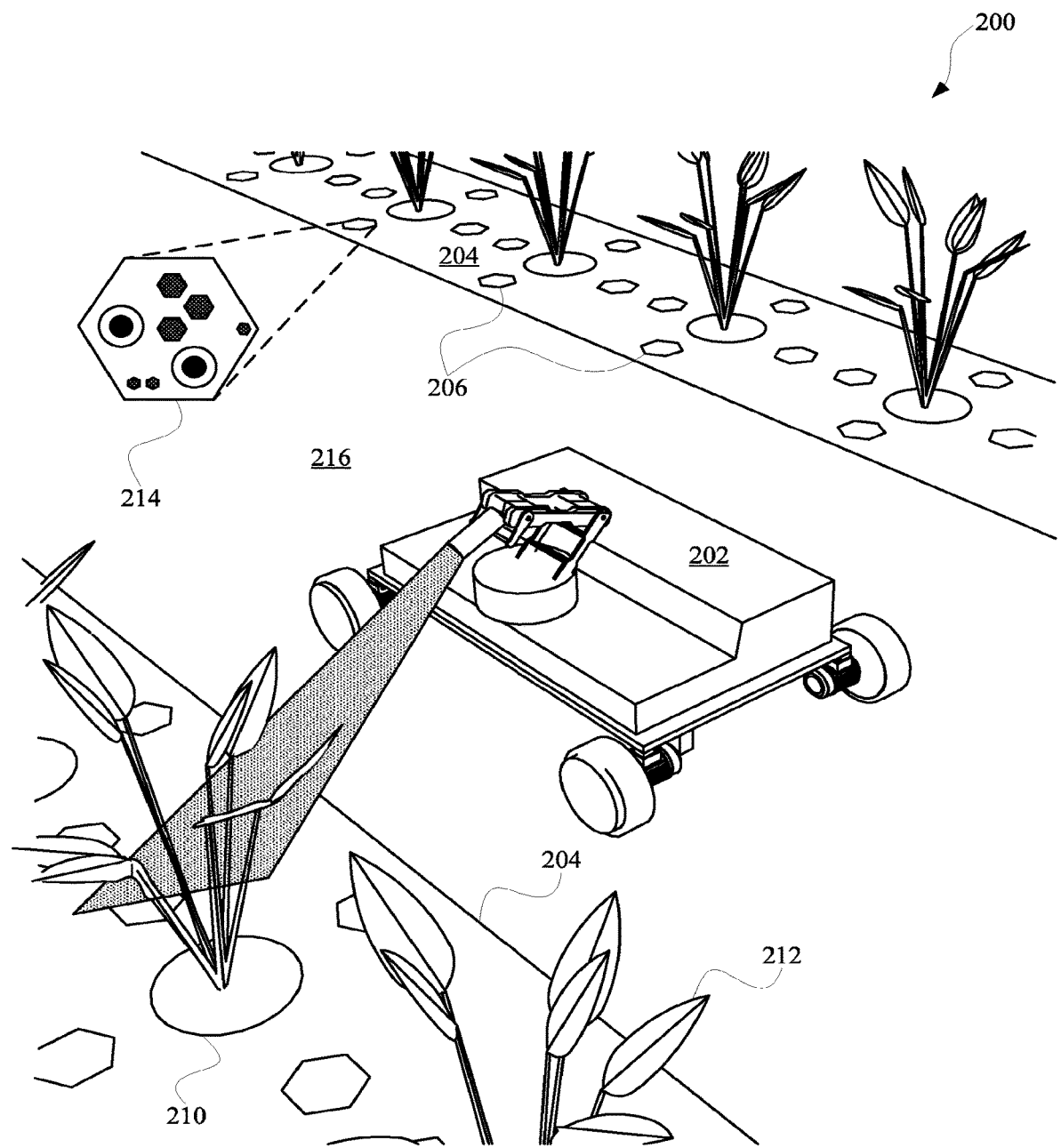
FIG. 2A and FIG. 2B illustrate views of a robot traversing an agricultural area in order to identify locations of fiducial markings relative to plants, and later, correlate features of the plants to the fiducial marking.
Figure 2B:
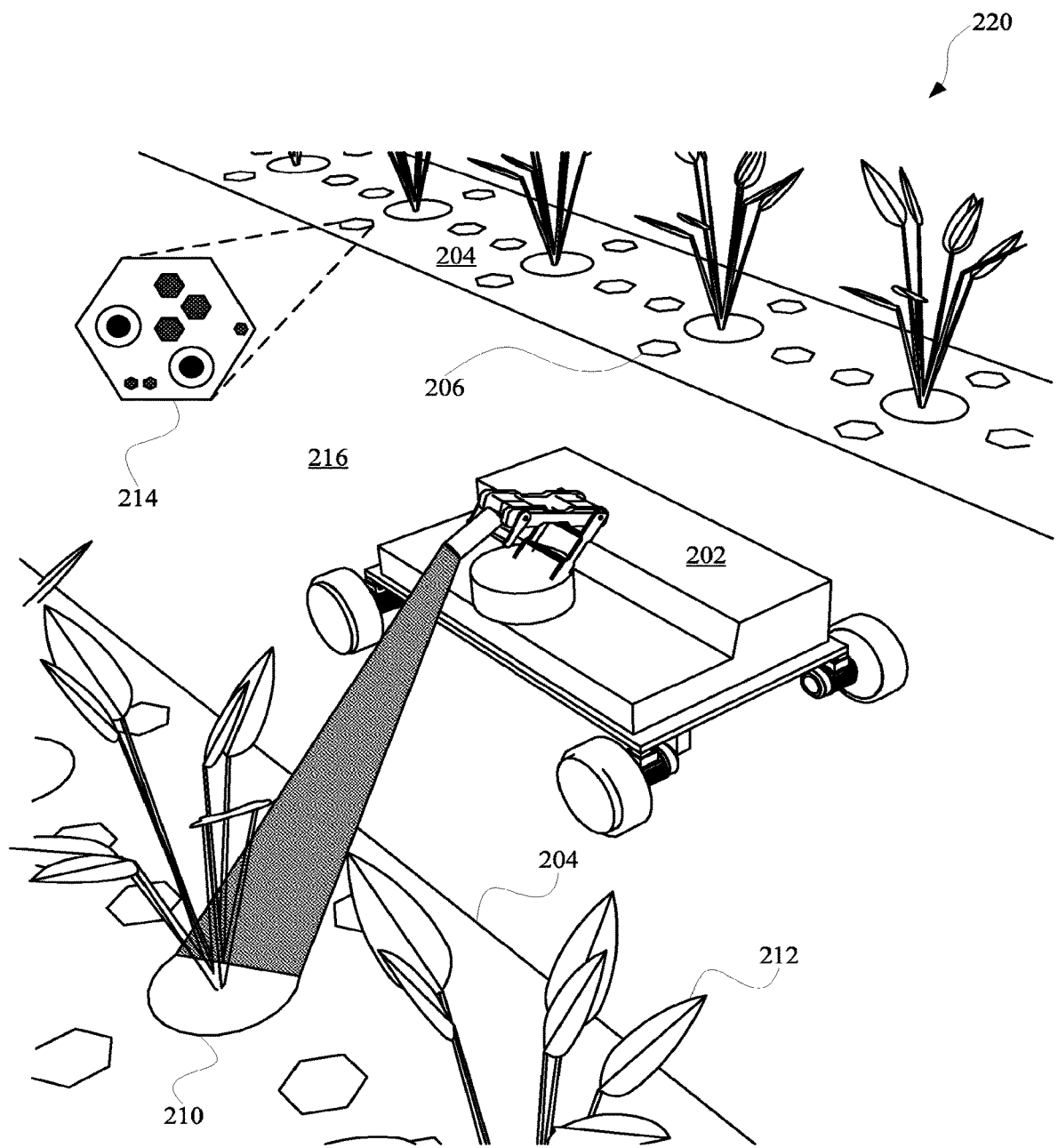

FIG. 2A and FIG. 2B illustrate views of a robot 202 traversing an agricultural area 216 in order to identify locations of fiducial markings 206 relative to plants 212, and later, correlate features of the plants 212 to the fiducial marking 206. FIG. 2A illustrates a view 200 of a robot 202 traversing an agricultural area 216 in furtherance of correlating one or more plants 212 to one or more fiducial markings 206. The robot 202 can include one or more apparatuses for inspecting and/or sensing certain features and/or properties of the agricultural area 216, the plants 212, and/or the synthetic mulch 204. As the plants 212 grow through openings 210 of the synthetic mulch 204, the robot 202 can generate agricultural data that provides a correlation between one or more fiducial markings 206 and a particular plant 212. For example, the vehicle 102 (shown in FIG. 1A) can print each fiducial marking 206 uniquely onto strips of synthetic mulch 204, and, when the robot 202 scans a particular fiducial marking 206, such as the particular fiducial marking 214, the robot 202 can generate and/or identify a unique identifier that can be correlated to the scanned fiducial marking 206.

As the robot 202 traverses the agricultural area 216 and scans more of the fiducial markings 206, relative locations of the fiducial markings 206 can be identified and stored as data in correspondence with each generated identifier. For example, because the indicia printed at each fiducial marking 206 can be unique across an area of the fiducial marking 206, a direction in which the robot 202 is scanning can be inferred from the fiducial markings 206. Furthermore, in some implementations, the robot 202 can scan a strip of synthetic mulch 204 extending near a first side of the robot 202 as the robot 202 is traversing the agricultural area 216 and also scan fiducial markings 206 on another strip of synthetic mulch 204 extending near a second side of the robot 202 that is opposite the first side. In this way, each relative location of each fiducial marking 206 on the same area of synthetic mulch and/or different areas of synthetic mulch can be identified and stored as relative location data.

In some implementations, one or more image processing techniques and/or machine learning can be used in order to correlate each plant 212 to one or more fiducial markings 206. For example, as illustrated in view 220 of FIG. 2B, the robot 202 can scan one or more portions of a plant 212 in order to generate data from which properties and/or features of the plant 212 can be determined. In some implementations, the robot 202 can scan one or more fiducial markings 206 simultaneous to scanning one or more plants 212. Thereafter, during processing of one or more images generated from the scanning, the one or more fiducial markings 206 can be correlated to the one or more plants 212. Furthermore, a location of each plant 212 can be identified based on a relative location of the fiducial markings 206 captured from one or more scans by the robot 202.

In some implementations, locations of the plants 212 and/or the fiducial markings 206 can be determined using differential GPS. This can be useful in some implementations when, for example, the plants 212 are growing under a canopy that causes satellite GPS to be inaccurate and/or ineffective for determining locations of the plants 212 and/or the robot 202. When using differential GPS, one or more reference stations can broadcast a signal characterizing a known location for the particular reference station. One more robots 202 traversing the agricultural area 216 can receive signals from one or more reference stations in order to calculate an exact location for a robot 202 at a particular time and/or location. When a current location is determined for a robot 202 that is scanning a particular fiducial marking 206 and/or plant 212, the robot 202 and/or another computing device can generate location data that can be stored in association with the fiducial marking 206 and/or the plant 212, in furtherance of tracking changes exhibited by the plant 212. Alternatively, or additionally, the robot 202 can refrain from employing GPS and/or RTK tracking techniques. Rather, the robot 202 can track and/or manage data characterizing relative locations of fiducial markings 206 with respect to other fiducial markings 206. For example, the robot 202 can generate data characterizing x, y, and/or z coordinates of fiducial markings 206 in order to determine their relative position and/or distance from each other. In this way, the robot 202 can generate routes to plants 212 of interest by inspecting nearby fiducial markings 206 in order to determine relative location of other fiducial markings 206 that are more proximate to the plants 212 of interest.

In other implementations, robot 202 may localize solely based on fiducial markings 206. For example, after synthetic mulch is applied to agricultural area 216, one or more robots may scout the agricultural area 216 surveying locations of fiducial markings 206 and, where applicable, the locations of fiducial markings 206 relative to plants 212. These robots may store this initial scouted data in one or more databases. Subsequent robots traveling through agricultural area 216 may use this data to localize themselves relative to plants 212. Consequently, the subsequent robots do not need to rely on GPS, which as noted previously may not be sufficiently accurate or even available (e.g., under a natural or man-made canopy) to determine which individual plant a robot is proximate.

The data stored in relation to each fiducial marking 206 and/or each plant 212 can be used prior to planting seeds, during planting or transplanting, during plant growth, during harvesting, collecting of produce from the plants 212, and/or when produce is received by a third party and/or consumed by consumers. For example, for each plant 212, agricultural data can be generated and stored in correlation with an identifier associated with the plant and/or a nearby fiducial marking(s) 206. Such data can include yield estimation, phenotyping, disease characteristics, plant characteristics such as color, chemical makeup, soil quality, temperature, moisture, brightness, surface texture, yield, growth rate, and/or any other data that can be associated with a plant. When a plant has yielded some amount of produce and the produce is received by a third party entity, the produce can be inspected at a receiving facility in order to determine certain properties of the produce.

For example, images of the received produce can be captured and processed to determine whether any of the produce is diseased. The diseased produce can be discarded and information provided to the supplier can be used to identify an origin of the diseased produce. For instance, printed indicia on the produce and/or a container carrying the produce can be correlated to one or more fiducial markings 206 disposed over the synthetic mulch 204 through which the yielding plant grew. Because each fiducial marking 206 can be associated with location data, the robot 202 can determine that the third party entity detected diseased produce that came from at a particular location within the agricultural area 216, navigate to the particular location that corresponds to the fiducial marking for the suspect plant, and perform one or more operations in furtherance of curing the plant of any disease.

For example, as illustrated in FIG. 2B, the robot 202 can perform an operation of providing some amount of material to an area from which a particular plant 212 is growing. As an example, when images of the received produce indicate that the yielding plant is under-watered, the robot 202 can process data received from the third party entity and determine that an operation of watering should be performed at the location corresponding to the under-watered plant 212. In this way, the robot 202 can be proactive about curing deficiencies of produce yielding plants in response to third party entities (e.g., grocery stores) detecting issues with certain produce. This can allow the supplier of the produce to yield larger sums of produce, as many issues would be cured more quickly thereby reducing a probability that more produce will be effectively yielded.

Figure 3:
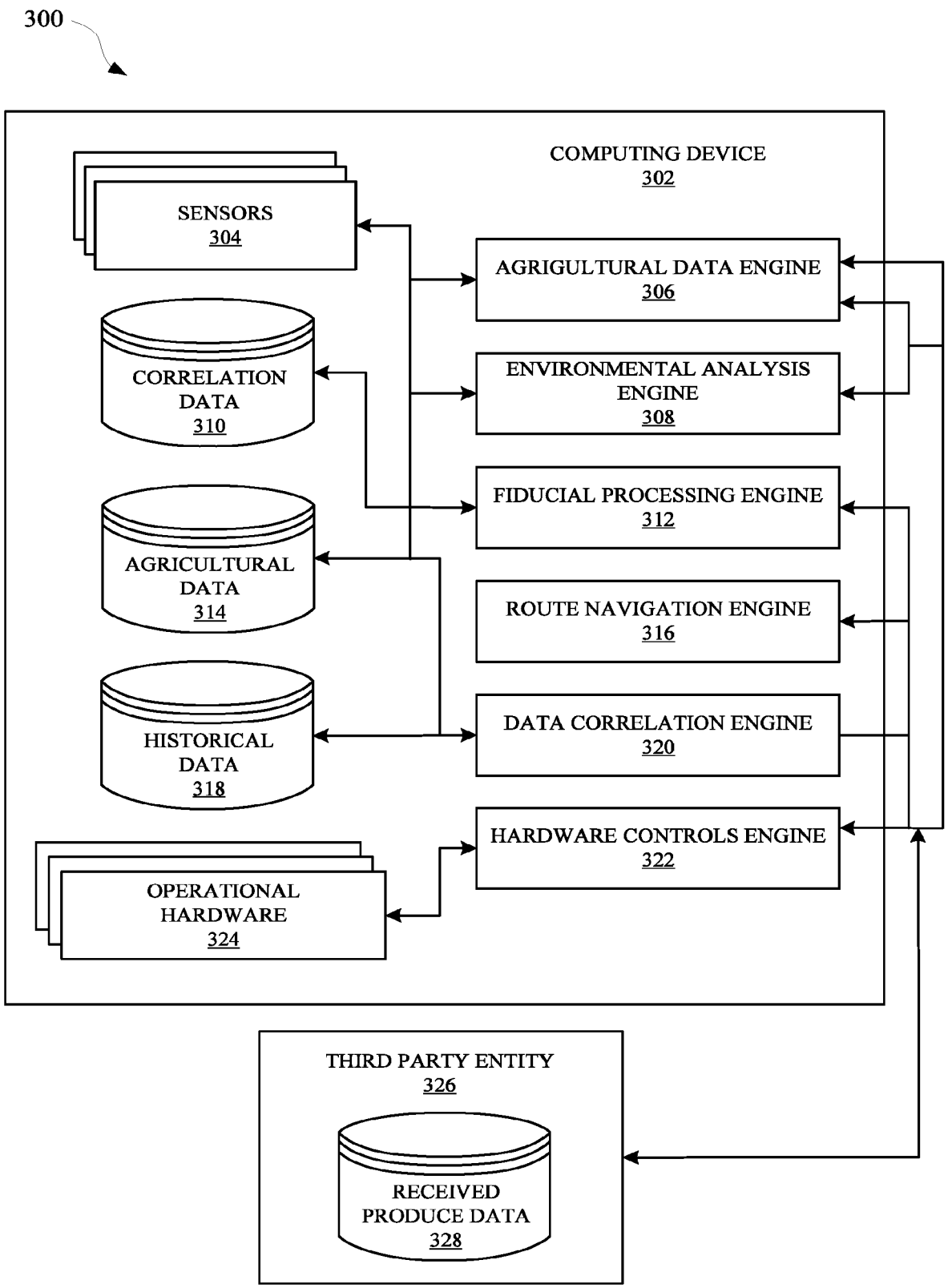
FIG. 3 illustrates a system for performing a variety of different agricultural operations using fiducial markings as reference points for initializing particular operations.

FIG. 3 illustrates a system 300 for performing a variety of different agricultural operations using fiducial markings as reference points for tracking and/or initializing particular operations. Specifically, the system 300 can include a computing device 302, which can be a robot capable of navigating through an agricultural area that can be used for yielding produce. For example, the computing device 302 can include one or more sensors 304 and/or various operational hardware 324 (e.g., end effectors, wheels, tracks, propellers, motors, etc.) that can be operated to enable the computing device 302 to autonomously navigate through an agricultural area, identify fiducial markings and/or plants, perform operations in furtherance of maintaining the agricultural area and/or the plants, collecting produce, and/or any other operation that can be performed at, or associated with, an agricultural area.

When the computing device 302 is navigating through an agricultural area that includes synthetic mulch with fiducial markings, the computing device 302 can use one or more sensors 304 to scan one or more of the fiducial markings. Signals from the one or more sensors 304 can be communicated to a fiducial processing engine 312. The one or more sensors 304 can include a camera, barcode scanner, QR code scanner, RFID scanner, and/or any other sensor(s) that can be used to scan an identifier for an object. The fiducial processing engine 312 can process signals from the sensors 304 in order to identify one or more particular fiducial markings that the computing device 302 has scanned. For example, the fiducial processing engine 312 can generate or otherwise identify an identifier for each fiducial marking scanned by the computing device 302. The fiducial processing engine 312 can use correlation data 310 in order to determine a correspondence between one or more fiducial markings and one or more identifiers stored in a database and/or plants in the agricultural area.

In some implementations, the fiducial processing engine 312 can use the correlation data 310 in order to determine a location and/or trajectory for the computing device 302, as the computing device 302 traverses a portion of the agricultural area. For example, the fiducial processing engine 312 can determine an orientation of the fiducial markings (e.g., matrix barcodes have inherent orientations) relative to previously scanned fiducial markings in order to determine a current location and/or trajectory of the computing device 302. The current location and/or the trajectory can be communicated to a route navigation engine 316, which can assist with providing instructions for navigating the computing device 302 through a particular route. For instance, the route navigation engine 316 can communicate with a hardware controls engine 322 in order to control operational hardware 324 of the computing device 302 in furtherance of controlling certain navigational aspects of the computing device 302 such as, velocity, steering, acceleration, lift, yaw, roll, and/or any other navigational maneuver capable of being performed by the computing device 302.

In some implementations, when the fiducial processing engine 312 has determined a correlation between a particular plant and one or more fiducial markings, the fiducial processing engine 312 can communicate with an agricultural data engine 306 in order to determine whether to perform one or more operations at the particular plant. For example, the agricultural data engine 306 can access agricultural data 314 and/or historical data 318 to determine whether the particular plant has a history of exhibiting one or more deficiencies. In some implementations, an environmental analysis engine 308 can be in communication with the one or more sensors 304 in order to determine whether a particular plant, which has been scanned by the one or more sensors 304, is exhibiting a feature or property indicative of a deficiency for the particular plant. When the environmental analysis engine 308 has identified a particular deficiency, the environmental analysis engine 308 can communicate with the agricultural data engine 306, which can generate agricultural data characterizing the particular deficiency. The generated agricultural data can be stored with the agricultural data 314, and correlation data can be generated by a data correlation engine 320 in order to characterize the correlation between the particular deficiency, and the particular plant and/or fiducial marking that was scanned.

When a particular deficiency is identified, data characterizing the particular deficiency can be accessed by the hardware controls engine 322 in order for the hardware controls engine 322 to select a particular operation to treat or cure of the particular deficiency. For example, the operational hardware 324 can include one or more apparatuses for providing to, and/or removing from, a particular plant, certain materials based on the particular deficiency identified. For instance, when the hardware controls engine 322 determines that the particular deficiency corresponds to a lack of minerals or lack of water, the hardware controls engine 322 can cause the operational hardware 324 to provide minerals and/or water to the particular plant exhibiting the particular deficiency.

In some implementations, a third party entity 326 can be in communication with the computing device 302 in order to determine properties of the produce received from an agricultural area that the computing device 302 is operating to maintain. For example, the third party entity 326 can communicate received produce data 328 characterizing properties and/or features of produce picked up by the computing device 302 and/or another device that is associated with the computing device 302. The environmental analysis engine 308 can process the received produce data 328 in order to identify a particular deficiency associated with some amount of produce supplied to the third party entity 326. Furthermore, the data correlation engine 320 can use the received produce data 328 and historical data 318 in order to correlate the received produce data 328 to one or more plants that have historically yielded produce that was provided to the third party entity 326.

When the environmental analysis engine 308 has identified one or more deficiencies or other ailments causing the defective produce, and when the data correlation engine 320 has identified the one of more plants that yielded the defective produce, the route navigation engine 316 can, based on this identification, generate a route for navigating to the one or more plants. Furthermore, the hardware controls engine 322 can identify one or more operations to perform at the one or more plants in order to improve a quality or condition of the one or more plants. The hardware controls engine 322 can then provide instructions to the operational hardware 324 in furtherance of causing the one or more operations to be performed on the one or more plants. In some implementations, feedback from the operational hardware 324 and/or the sensors 304 can be used to collect data, which can be indicative of an efficacy of operations performed on the one or more plants to improve their quality and/or condition. In this way, the computing device 302 will be able to learn and adapt to more frequently employ those operations that have a history of effectively improving plants that have been indicated as deficient by third party entities 326.

Figure 4:
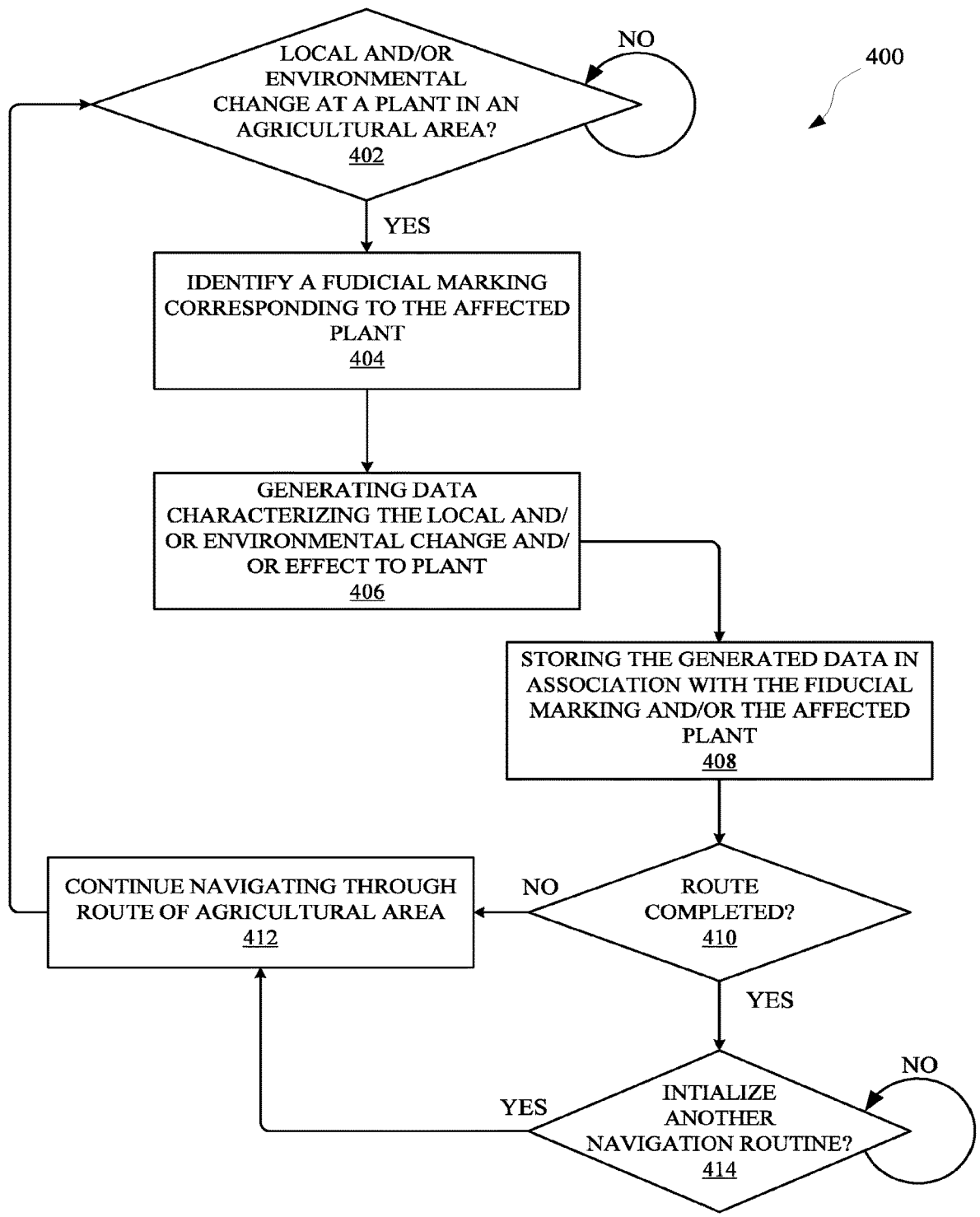
FIG. 4 illustrates a method for identifying fiducial markings located in an agricultural area and generating data for each fiducial marking and plant that corresponds to a corresponding fiducial marking.

FIG. 4 illustrates a method 400 for identifying fiducial markings located in an agricultural area and generating data for each fiducial marking and each plant that corresponds to a fiducial marking. The method 400 can be performed by one or more computing devices, applications, and/or any other apparatus or module capable of controlling a robot and/or accessing agricultural data. The method 400 can include an operation 402 of determining whether there has been a local or environmental change at a plant in an agricultural area. In some implementations, the determination at operation 402 can be based on information received from a separate entity that scans produce from the agricultural area for deficiencies, such as certain physical properties that can make the produce unhealthy for consumers. Alternatively, or additionally, the determination at operation 402 can be based on information received from a robot that has traversed a portion of the agricultural area that includes the plant and has detected a local change at the plant using one or more sensors.

When a local or environmental change is not determined to have been detected at the plant in the agricultural area, the method 400 can continue to monitor for local and/or environmental changes. However, when a local or environmental change is determined to have been detected at the plant in the agricultural area, the method 400 can proceed from the operation 402 to an operation 404. The operation 404 can include identifying a fiducial marking corresponding to the affected plant. In some implementations, identifying the fiducial marking can include processing the received information to determine a correlation between the received information and the plants or the fiducial marking corresponding to the plant. Alternatively, or additionally, identifying the fiducial marking can include processing data generated by a robot using one or more sensors that detect the fiducial markings at or near a plant. The fiducial markings can be, for example, a barcode, a QR code, an RFID tag, a printed label, an embedded label, and/or any other identifier that can be located on a synthetic mulch or other agricultural surface.

In some implementations, data stored in correlation with a fiducial marking can include coordinate data that characterizes a latitude and/or longitude of a position of the fiducial marking, a time stamp that characterizes a time and/or date on which the fiducial marking was scanned, and/or any other metadata that can characterize properties of a circumstance in which the fiducial marking was scanned. Thereafter, other fiducial markings can be determined to be related based on similarities and/or differences between metadata. For instance, when multiple fiducial markings are determined to be in close proximity to one another when a plant and any surrounding fiducial markings are inspected, unique identifiers corresponding to those fiducial markings can be correlated, in a database, to the previously generated metadata. In this way, agricultural areas of interest to the robot and other entities can be identified via correspondence between metadata correlated to the physical fiducial markings disposed about an agricultural area.

The method 400 can proceed from the operation 404 to an operation 406. The operation 406 can include generating data that characterizes the local or environmental change, and/or an effect on the plant. As an example, as the robot is navigating through the agricultural area and has identified the particular plant, the robot can use one or more sensors to identify one or more physical properties of the particular plant. Thereafter, the fiducial marking can be scanned and the robot can generate data that provides a correspondence between the physical properties and the fiducial marking. Alternatively, or additionally, the information provided by a separate entity that has received produce from the plant can indicate a local or environmental change to the particular plant based on scanning the produce. Using this information, the robot can navigate to the fiducial marking corresponding to the plant, and use one or more sensors to identify physical properties of the particular plant. The robot can then, at operation 408, optionally generate data characterizing the physical properties and store the generated data in association with the fiducial marking and/or the particular plant. Specifically, the method 400 can proceed from the operation 406 to the operation 408 of optionally storing the generated data in association with the fiducial marking and/or the affected plant.

The method 400 can proceed from the operation 408 to an operation 410 that includes determining whether a route being navigated by the robot has been completed. The route can be stored at the robot and can be used by the robot to move from fiduciary marking to fiduciary marking. For example, route data can characterize a location of each plant in the agricultural area relative to each fiduciary marking in the agricultural area. In this way, when the robot identifies a particular fiduciary marking and a plant, the robot will be able to identify a relative location of any other fiduciary marking and/or other plants.

When the route is determined to not have been completed by the robot, the method 400 can proceed from the operation 410 to an operation 412 of continuing navigating through the route of the agricultural area. Alternatively, when the route is determined to have been completed by the robot, the method 400 can proceed from the operation 410 to an operation 414. The operation 414 can include determining whether to initialize another navigation routine, in which the robot will maneuver through the same route or a different route through the agricultural area. For example, when the robot completes a route of scanning each fiduciary marking and optionally generating data for each plant, the robot can travel out of the agricultural area and dock itself in order to receive maintenance, receive charge, upload data, receive updates, and/or perform any other operation that may be associated with the robot and/or the agricultural area. Thereafter, and at the operation 414, when the robot is instructed to, or otherwise caused to, initialize another navigation routine, the method 400 can proceed from the operation 414 to the operation 412. Furthermore, as the robot is navigating through the other routine, the robot can use one or more sensors to detect local and environmental changes in accordance with the operation 402.

Figure 5:
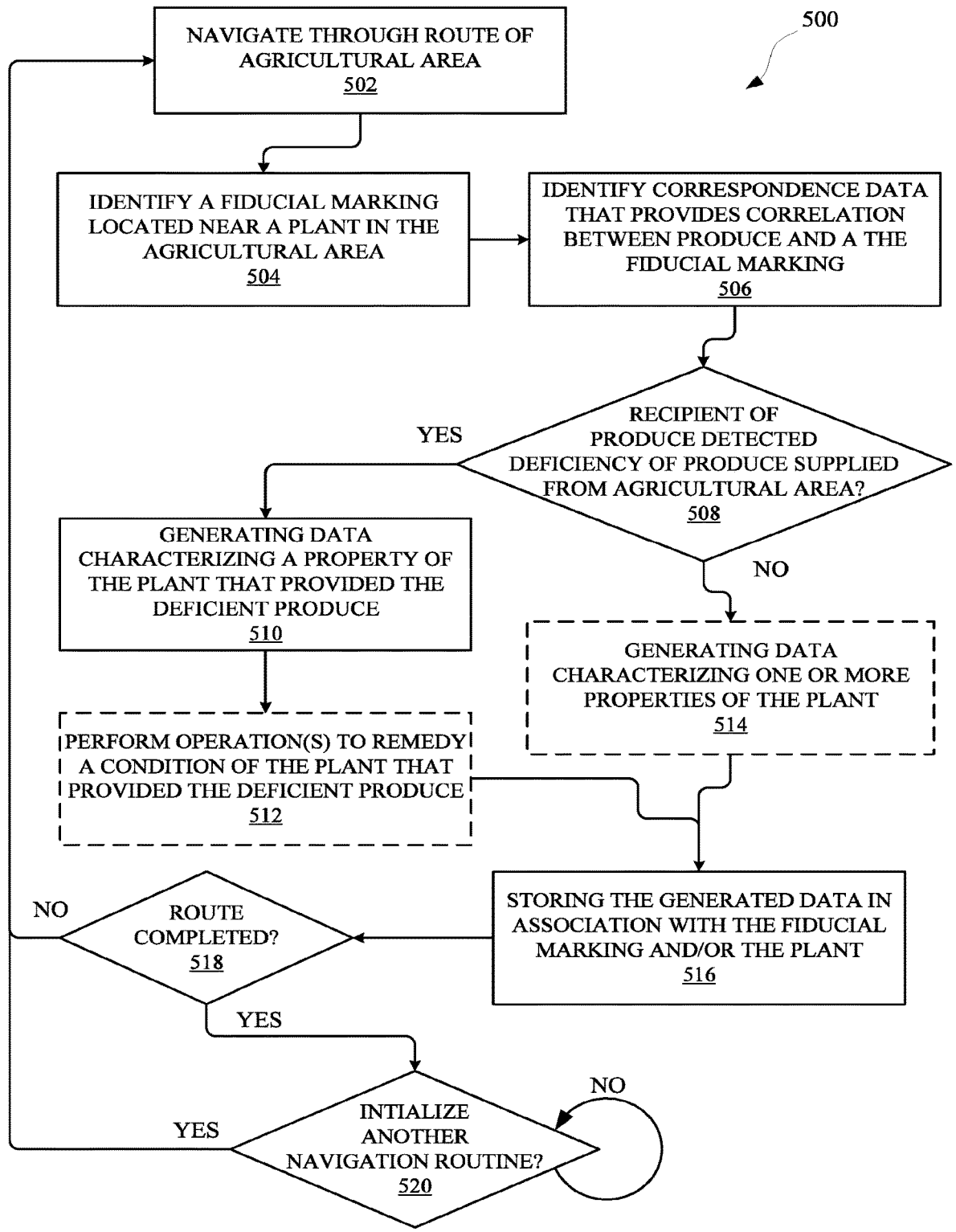
FIG. 5 illustrates a method for correlating produce data to individual plants from which corresponding produce came.

FIG. 5 illustrates a method 500 for correlating produce data to individual plants from which corresponding produce came. The method 500 can be performed by one or more computing devices, applications, and/or any other apparatus or module capable of controlling a robot and/or accessing agricultural data. The method 500 can include an operation 502 of navigating through a route within an agricultural area. The route can be characterized by route data stored at a robot that operates to monitor changes to plants located within the agricultural area. When the robot detects a plant property, physical feature, and/or particular condition of a plant that is helpful or problematic to a total yield of the plant, the robot can generate agricultural data characterizing the property, feature, and/or the condition. Furthermore, the robot can address certain properties and/or conditions that can be remedied by one or more operations of the robot, such as adding or removing materials or organisms to or from an area of one or more plants of a plurality of plants located within the agricultural area.

The method 500 can proceed from the operation 502 to an operation 504 of identifying a fiducial marking located near a plant in the agricultural area. The fiducial marking can be a label that is disposed over synthetic mulch that at least partially surrounds the plant in the agricultural area. The label can include any amount of indicia, such as one or more symbols, numbers, letters, barcodes, texture, and/or any combination thereof. Alternatively, or additionally, the fiducial marking can be an RFID tag that is attached to the synthetic mulch and/or a location adjacent to each plant of the plurality of plants the robot can identify a fiducial marking by using one or more sensors to collect data from the fiducial marking and process the data to confirm that the collected data corresponds to a particular fiducial marking.

The method 500 can proceed from the operation 504 to an operation 506 that includes identifying correspondence data that provides a correlation between produce and a fiducial marking. The correspondence data can be generated based on previous instances when one or more robots traversed the agricultural area, identified various fiducial markings and nearby plants, and generated the correspondence data in order to characterize relationships between the fiducial markings and the plants. Alternatively, or additionally, the correspondence data can be provided by one or more computing devices tasked with scanning an area that includes the plants and the fiducial markings, processing images that include the plants and of the fiducial markings, and generating the correspondence data that is based on the processing.

The method 500 can proceed from the operation 506 to an operation 508 that includes determining whether a recipient of produce detected a deficiency with the produce that was supplied from the agricultural area. The determination can be based on information supplied by the recipient, which can use one or more devices to examine produce supplied from the agricultural area. For example, one or more computing devices can be used by the recipient to process images of incoming produce, and the images can be analyzed using one or more machine learning models that have been trained to identify problematic or otherwise deficient vegetation. Based on the analysis, the recipient of the produce can transmit information to the robot and/or any other computing device associated with the agricultural area. In this way, the robot and/or other computing devices can remedy one or more plants that are exhibiting the deficiency identified by the recipient of the produce.

When a recipient of the produce has not identified a deficiency with the produce supplied by the plant corresponding to the identified fiducial marking, the method 500 can proceed from the operation 508 to an operation 514. The operation 514 can be an optional operation that includes generating data characterizing one or more properties of the plant. For example, despite the plant corresponding to the identified fiducial marking not having a record of providing sufficient produce, the robot can none the less analyze the plant and generate data characterizing one or more properties of the plant. In this way, should one or more properties characterize an unhealthy property of the plant, the operations taken by the robot would prevent subsequent harm, should produce from the plant be disseminated.

When a recipient of the produce has identified a deficiency with the produce supplied by the plant corresponding to the identified fiducial marking, the method 500 can proceed from the operation 508 to an operation 510. The operation 510 can include generating data characterizing a property of the plant that provided the deficient produce. In this way, the robot can verify whether there is a detectable deficiency with the plant. Moreover, the robot can generate the data in order to provide some correspondence between a current state at the plant and the deficiency of the produce provided to the recipient. In some implementations, data generated by the robot and information provided by a recipient can be used to train one or more machine learning models in order to allow each robot to use subsequently collected data to diagnose and/or remedy certain conditions of plants.

In some implementations, the method 500 can optionally include an operation 512 of performing one or more operations to remedy the condition of the plant that provided the deficient produce. For example, when a condition of the plant that caused the deficient produce corresponds to an organism that negatively impacted an environment of the produce, the robot can perform one or more operations to remove and/or eliminate the organism. Alternatively, or additionally, when a condition of the plant that yielded the produce corresponds to a lack of minerals and/or water, the robot can perform one or more operations to add water and/or other materials to an area occupied by the plant. For instance, the robot can maneuver toward the plant and add or remove materials or organisms to, or from, an area defined by an outer edge of the plant. Furthermore, the robot can generate data characterizing the one or more operations performed at the particular plant for future reference and/or for determining whether the one or more operations were effective in treating the particular plant. Thereafter, the data can be used during subsequent operations to adjust properties of materials added to and/or removed from an area occupied by a plant, based on historically recorded efficacy of the properties treating plants during previous operations.

The method 500 can proceed to an operation 516 of storing any generated data in association with the fiducial marking and the particular plant.

The method 500 can proceed from the operation 516 to an operation 518 that includes determining whether a route through which the robot is navigating has been completed. When the robot has not completed the current route, the method 500 can proceed from the operation 518 to the operation 502, in furtherance of traversing the agricultural area toward a different plant and/or a different fiducial marking. However, when the route has been completed by the robot, the method 500 can proceed from the operation 518 to an operation 520. The operation 520 can include determining whether to initialize another navigation routine. Instructions to perform another navigation routine can be autonomously identified and/or received from a source that is external to the robot. When the robot has determined to initialize another navigation routine, the method 500 can proceed to the operation 502, otherwise the robot can await further instructions to assist with certain operations in the agricultural area.

Figure 6:
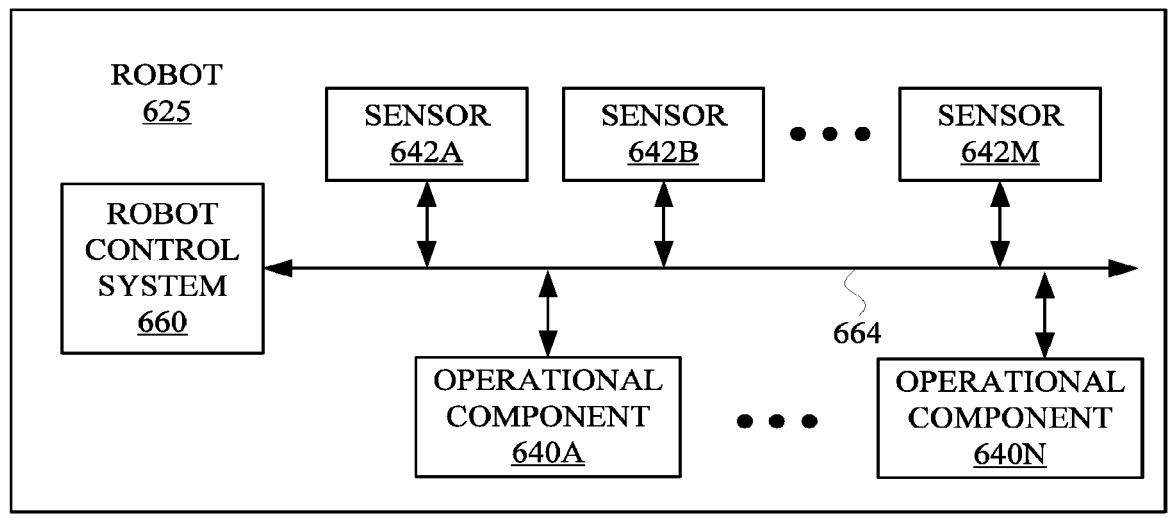
FIG. 6 is a block diagram of an example robot.

FIG. 6 schematically depicts an example architecture of a robot 625. The robot 625 includes a robot control system 660, one or more operational components 640A-640N, and one or more sensors 642A-642M. The sensors 642A-642M may include, for example, vision components, light sensors, pressure sensors, pressure wave sensors (e.g., microphones), proximity sensors, accelerometers, gyroscopes, thermometers, barometers, and so forth. While sensors 642A-642M are depicted as being integral with robot 625, this is not meant to be limiting. In some implementations, sensors 642A-642M may be located external to robot 625, e.g., as standalone units.

Operational components 640A-640N may include, for example, one or more end effectors and/or one or more servo motors or other actuators to effectuate movement of one or more components of the robot. For example, the robot 625 may have multiple degrees of freedom and each of the actuators may control actuation of the robot 625 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 660 may be implemented in one or more processors, such as a CPU, GPU, and/or other controller(s) of the robot 625. In some implementations, the robot 625 may comprise a "brain box" that may include all or aspects of the control system 660. For example, the brain box may provide real time bursts of data to the operational components 640A-640N, with each of the real time bursts comprising a set of one or more control commands that dictate, inter alia, the parameters of motion (if any) for each of one or more of the operational components 640A-640N. In some implementations, the robot control system 660 may perform one or more aspects of one or more methods described herein.

As described herein, in some implementations all or aspects of the control commands generated by control system 660 can be generated based on 3D bounding shapes generated according to techniques described herein.

Although control system 660 is illustrated in FIG. 6 as an integral part of the robot 625, in some implementations, all or aspects of the control system 660 may be implemented in a component that is separate from, but in communication with, robot 625. For example, all or aspects of control system 660 may be implemented on one or more computing devices that are in wired and/or wireless communication with the robot 625, such as computer system 710.

Figure 7:
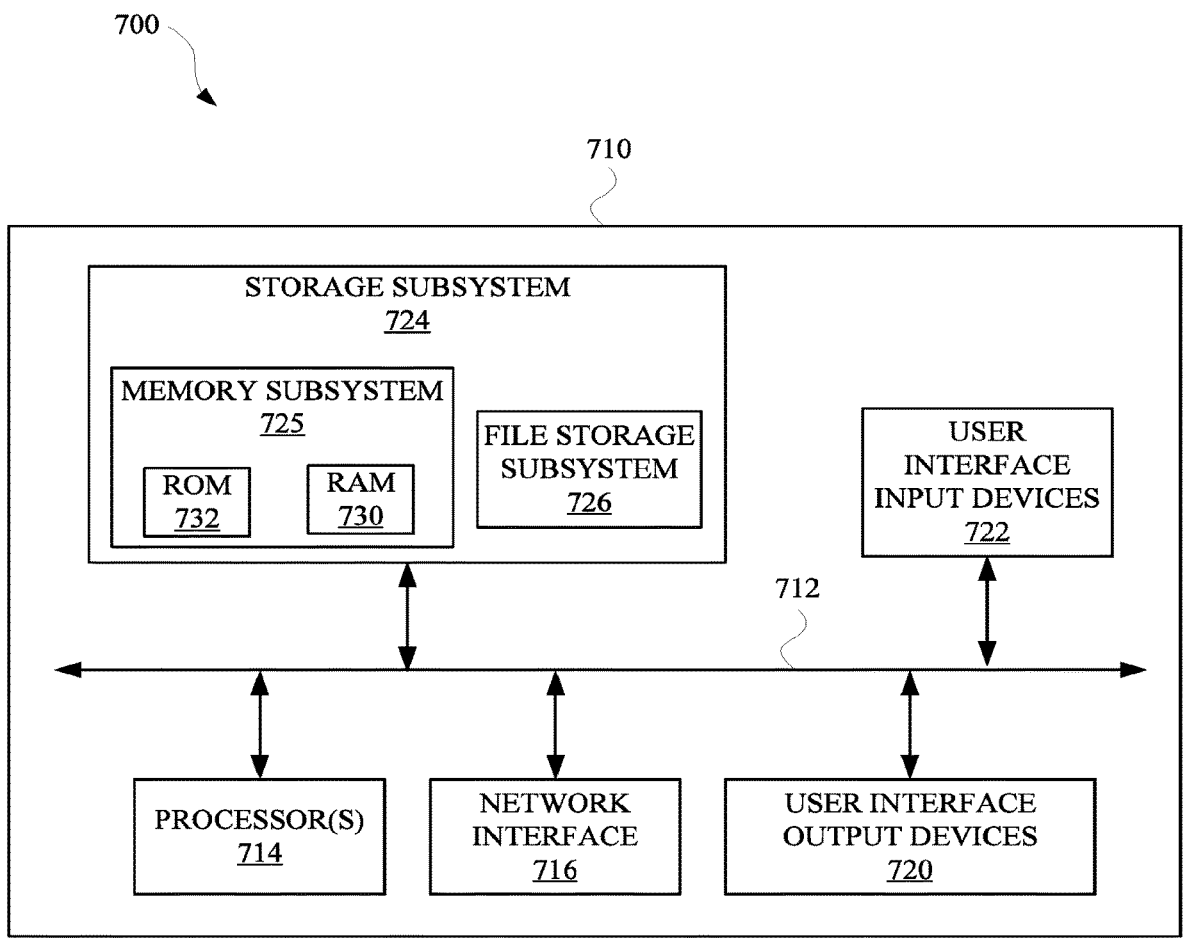
FIG. 7 is a block diagram of an example computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 400, method 500 and/or to implement one or more of system 300, vehicle 102, embedded apparatuses in synthetic mulch, robot 202, and/or any other application, device, apparatus, and/or module discussed herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as disposing a synthetic mulch over an agricultural area that includes a plurality of plants, where each plant of the plurality of plants extends through an aperture in the synthetic mulch, and wherein the synthetic mulch includes fiducial markings that are detectable by a robot. The method can further include causing, subsequent disposing the synthetic mulch over the agricultural area, one or more robots to identify each fiducial marking in the agricultural area and generate correspondence data that correlates each plant of the plurality of plants to one or more fiducial markings. The method can also include, subsequent to causing the one or more robots to identify each fiducial marking: causing one or more of the robots to navigate through the agricultural area in furtherance of locating a particular plant of the plurality of plants using the correspondence data, and when the one or more robots have located the particular plant: causing the one or more robots to perform an operation in furtherance of affecting a physical condition of the plant.

In some implementations, the method can further include an operation of, subsequent to causing the one or more robots to identify each fiducial marking: determining that the particular plant is exhibiting a condition that can be remedied by the operation, wherein the causing the one or more robots to navigate through the agricultural area and perform the operation is performed subsequent to determining that the particular plant is exhibiting the particular condition. In some implementations, the operation includes adding, or removing, a material or an organism to, or from, an area having a boundary defined by an outer edge of the particular plant.

In other implementations, a method implemented by one or more processors is set forth as including operations such as navigating, by a robot, through a route that includes an agricultural area, wherein the robot includes one or more sensors that detect properties of a plurality of plants located in the agricultural area. The method can also include identifying, when the robot is located in the agricultural area, a fiducial marking that is located near a plant of the plurality of plants in the agricultural area, wherein the fiducial marking is associated with agricultural data that is accessible to the robot and provides a correlation between the fiducial marking and the plant. The method can further include an operation of determining, based on the agricultural data that is associated with the fiducial marking, whether the plant has exhibited a condition that can be remedied via the robot or a separate computing device. The method can further include an operation of when the plant is determined to have exhibited the condition that can be remedied by the robot or the separate computing device: causing the robot or the separate computing device to initialize performance of an operation in furtherance of remedying the condition exhibited by the plant. The method can further include an operation of, when the plant is determined to not have exhibited the condition that can be remedied by the robot or the separate computing device: bypassing causing the robot or the separate computing device to initialize performance of the operation, and causing the robot to maneuver through the route toward another fiducial marking corresponding to another plant located in the agricultural area.

In some implementations, the agricultural data is generated based on information received from a separate entity that received produce from the agricultural area and determined that the condition was being exhibited by the received produce. In some implementations, the information characterizes a physical feature of the produce that results from the condition, and wherein the operation includes adding, or removing, a material or an organism to, or from, an area having a boundary defined by an outer edge of the plant. In some implementations, the robot is an autonomous agricultural device that includes one or more sensors that are used to identify each fiducial marking of a plurality of fiducial markings located in the agricultural area, and wherein each fiducial marking of the plurality of fiducial markings is located adjacent to a respective plant of the plurality of plants within the agricultural area.

In some implementations, each fiducial marking is located at a surface of synthetic mulch, a pipe, a hose, and/or a bag that is located near each plant of the plurality of plants, and wherein the fiducial marking is a visible marking or a radio-frequency identification (RFID) tag. In some implementations, determining whether the plant has exhibited the condition that can be remedied via the robot or the separate computing device includes: determining whether the condition has been exhibited and remedied by another computing device located in a separate agricultural area that includes different fiducial markings for other plants that are located in the separate agricultural area.

In yet other implementations, a method implemented by one or more processors is set forth as including operations such as determining, by a robot that traverses an agricultural area, that an environmental change is affecting an environment of a particular plant, wherein the particular plant is located in the agricultural area, which includes a plurality of plants surrounded by synthetic mulch, and wherein the environmental change is determined using one or more sensors of the robot. The method can identifying, before, during, or after determining that the environmental change is affecting the particular plant, a fiducial marking that is disposed over a portion of the synthetic mulch that is proximate to the particular plant, wherein each plant of the plurality of plants corresponds to a unique fiducial marking of a plurality of fiducial markings that are also disposed over the synthetic mulch. The method can further include an operation of generating, based on identifying the fiducial marking and the environmental change, agricultural data that characterizes the environmental change. The method can further include an operation of storing the agricultural data in association with the particular plant.

In some implementations, the method can further include an operation of, subsequent to generating the agricultural data: identifying, during a separate instance when the robot or a different robot is traversing the agricultural area, the fiducial marking that is disposed over the portion of the synthetic mulch that is proximate the particular plant. The method can further include an operation of determining, based on identifying the fiducial marking, a plant property exhibited by the particular plant subsequent to the environmental change affecting the particular plant. The method can further include an operation of generating, based on the plant property exhibited by the particular plant, additional agricultural data that characterizes the plant property and is stored in association with the fiducial marking and the particular plant.

In some implementations, determining that the environmental change is affecting the environment of the particular plant includes identifying, using one or more sensors that are connected to the robot, an organism that is affecting the particular plant, and wherein the additional agricultural data characterizes an identity of the organism or an extent to which the organism affected the particular plant since the organism was identified. In some implementations, identifying the fiducial marking that is disposed over the portion of the synthetic mulch includes: capturing, using a camera of the robot, one or more images of the fiducial marking, and processing, at the robot or the separate computing device, the one or more images to determine whether the one or more images correspond to the fiducial marking of the plurality of fiducial markings. In some implementations, the method can further include an operation of, subsequent to generating the agricultural data: causing, before the camera of the robot captures the one or more images of the fiducial marking, the robot to traverse through the agricultural area toward the particular plant. In some implementations, the method can further include an operation of, subsequent to generating the agricultural data: determining, based on identifying the fiducial marking and the agricultural data, a maintenance operation to perform on the particular plant in furtherance affecting the plant property exhibited by the particular plant.

In yet other implementations, the method can further include an operation of receiving, at a computing device that stores agricultural data, analysis data indicating that a particular plant of a plurality of plants in an agricultural area has yielded deficient produce. The method can further include an operation of identifying, based on receiving the analysis data, correspondence data that provides a correlation between the particular plant and a fiducial marking located in the agricultural area near the particular plant. The method can further include an operation of generating, based on the analysis data and the correspondence data, agricultural data that characterizes a physical property of the deficient produce provided by the particular plant, wherein the agricultural data is stored in association with the fiducial marking and is accessible to a robot that traverses the agricultural area. The method can further include an operation of, subsequent to generating the agricultural data: causing the robot to identify the fiducial marking that corresponds to the particular plant, and causing the robot to generate additional agricultural data based on input to one or more sensors that are connected to the robot, wherein the additional agricultural data characterizes a condition of the plant subsequent to the deficient produce exhibiting the physical property, and wherein the additional agricultural data is stored in association with the fiducial marking and the particular plant.

In some implementations, the method can further include an operation of, subsequent to generating the agricultural data: determining the condition of the particular plant that caused the particular plant to yield the deficient produce, and causing the second computing device to perform an operation in furtherance of remedying the condition of the particular plant. In some implementations, the fiducial marking is located on synthetic mulch within an area defined by an outer edge of the particular plant and the synthetic mulch includes an aperture through which the particular plant extends. In some implementations, the operation includes adding or removing an amount of material to the area in furtherance of remedying the condition of the particular plant. In some implementations, the fiducial marking is located on a surface of synthetic mulch, a pipe, a hose, and/or a bag that is located near the particular plant. In some implementations, the correspondence data was previously generated based on the robot or another autonomous vehicle identifying the particular plant and scanning the fiducial marking. In some implementations, causing the robot to identify the fiducial marking that corresponds to the particular plant includes causing the robot to traverse a portion of the agricultural area and maneuver toward the particular plant. In some implementations, the analysis data is generated by an entity that receives produce from the agricultural area and is located outside of the agricultural area, and wherein the robot is an autonomous vehicle that is in communication with the computing device.

In some implementations, a computer program product is set forth as comprising instructions, which, when executed by one or more processors, cause the one or more processors to carry out the method of any one of the claims. In some implementations, a computer-readable storage medium is set forth as comprising instructions, which, when executed by one or more processors, cause the one or more processors to carry out the method of any of the claims. In some implementations, a system is set forth as comprising one or more processors for carrying out the method of any one of claims.

In yet other implementations, synthetic mulch is set forth as including a layer of synthetic material, wherein the layer of synthetic material is configured to at least partially cover soil in which one or more plants are planted, or will be planted, in an agricultural area. The synthetic mulch can also include a plurality of fiducial markings disposed onto the layer of synthetic material, wherein each fiducial marking of the plurality of fiducial markings is readable by a robot that is capable of traversing the agricultural area, and wherein, when the layer of synthetic mulch is disposed over the agricultural area, a respective location of each plant of the one or more plants within the agricultural area can be determined, by the robot, using one or more fiducial markings of the plurality of fiducial markings.

In some implementations, the plurality of fiducial markings comprise a plurality of indicia are printed onto the layer of synthetic material. In some implementations, the plurality of fiducial markings comprise one-dimensional or two-dimensional bar codes. In some implementations, the plurality of fiducial markings comprise a plurality of radio-frequency identification ("RFID") tags. In some implementations, the synthetic mulch can be modified according to any of the description provided herein, including descriptions related to any of the methods discussed herein.

I claim:

1. An agricultural apparatus comprising:
at least one strip of synthetic mulch configured to be lain over an agricultural area, wherein the strip of synthetic mulch defines a plurality of openings to facilitate growth of a plurality of plants; and
a plurality of fiducials configured to detect one or more properties of soil of the agricultural area and disposed on the strip of synthetic mulch, wherein each of the plurality of fiducials are disposed on the synthetic mulch at defined spatial relationships relative to the plurality of openings and are detectable by one or more robots;
wherein each of the plurality of fiducials is usable by one or more of the robots to generate correspondence data that correlates each fiducial of the plurality of fiducials to one or more of the openings.

2. The agricultural apparatus of claim 1, wherein the at least one strip of synthetic mulch is constructed with plastic.

3. The agricultural apparatus of claim 2, wherein the at least one strip of synthetic mulch is configured to filter one or more frequencies of electromagnetic radiation.

4. The agricultural apparatus of claim 2, wherein the at least one strip of synthetic mulch is configured to maintain methyl bromide within soil beneath the at least one strip of synthetic mulch.

5. The agricultural apparatus of claim 1, wherein each opening is surrounded by two of more of the plurality of the fiducials.

6. The agricultural apparatus of claim 1, wherein one or more of the fiducials comprises a quick response (QR) code printed on the strip of synthetic mulch.

7. The agricultural apparatus of claim 1, wherein one or more of the fiducials comprises a radio-frequency identification (RFID) tag.

8. The agricultural apparatus of claim 1, wherein one or more of the plurality of fiducials comprises a Bluetooth beacon.

9. The agricultural apparatus of claim 1, wherein the plurality of fiducials are regularly spaced on the strip of synthetic mulch.

10. The agricultural apparatus of claim 1, wherein a given fiducial of the plurality of fiducials is arranged to indicate an orientation of the given fiducial.

11. The agricultural apparatus of claim 10, wherein the orientation of the given fiducial is selected to indicate a direction in which the strip of synthetic mulch extends.

12. The agricultural apparatus of claim 10, wherein the orientation of the given fiducial is selected to indicate a location of one or more of the robots relative to one or more of the openings.

13. A method implemented by one or more processors of one or more robots, the method comprising:
in an agricultural area that includes a plurality of plants each extending through an aperture in a synthetic mulch that is disposed over the agricultural area and that includes a plurality of fiducial markings configured to detect one or more properties of soil of the agricultural area and that are detectable by a robot, causing the one or more robots to identify each of the plurality of fiducial markings in the agricultural area and to generate, via one or more of the processors, correspondence data that correlates each plant of the plurality of plants to one or more of the plurality of fiducial markings;
wherein the correspondence data enables one or more of the robots to subsequently navigate through the agricultural area to locate a particular plant of the plurality of plants and perform an operation in furtherance of affecting a physical condition of the particular plant.

14. The method of claim 13, further comprising:
subsequent to causing the one or more robots to identify each of the plurality of fiducial markings:
determining that the particular plant is exhibiting the physical condition that can be remedied by the operation; and
causing the one or more robots to navigate through the agricultural area to locate the particular plant and perform the operation.

15. The method of claim 14, wherein determining that the particular plant is exhibiting the physical condition is based on information received from a separate entity that received produce from the agricultural area and determined that the condition was being exhibited by the received produce.

16. The method of claim 13, wherein the operation includes adding, or removing, a material or an organism to, or from, an area having a boundary defined by an outer edge of the particular plant.

17. The method of claim 13,
wherein the one or more robots include autonomous agricultural devices that each include one or more sensors that are used to identify each of the plurality of fiducial markings located in the agricultural area, and
wherein each of the plurality of fiducial markings is located adjacent to a respective plant within the agricultural area.

18. The method of claim 13, wherein at least one of the plurality of fiducial markings is a visible marking or a radio-frequency identification (RFID) tag.

19. A non-transitory computer-readable medium comprising:
correspondence data that correlates each plant of a plurality of plants growing in an agricultural area to one or more robot-detectable fiducial markings on synthetic mulch that is disposed over the agricultural area and configured to detect one or more properties of soil of the agricultural area and, such that the correspondence data enables one or more robots to navigate through an agricultural area to locate an individual plant of the plurality of plants and perform an operation in furtherance of affecting a physical condition of the individual plant;
wherein the correspondence data was generated by causing one or more robots to identify, in the agricultural area that includes the plurality of plants each extending through an aperture in the synthetic mulch, each robot-detectable fiducial marking in the agricultural area and to generate the correspondence data.

20. The non-transitory computer-readable medium of claim 19, wherein the correspondence data further enables one or more of the robots to determine a direction in which the synthetic mulch is extended.

\* \* \* \* \*